Nov. 14, 1950 R. C. WEBB 2,530,107

COLOR TELEVISION RECEIVING SYSTEM

Filed Aug. 10, 1946

INVENTOR
RICHARD C. WEBB
BY
W. S. Grover
ATTORNEY

Patented Nov. 14, 1950 2,530,107

UNITED STATES PATENT OFFICE 2,530,107

COLOR TELEVISION RECEIVING SYSTEM

Richard C. Webb, Princeton, N. J., assignor to Radio Corporation of America, a corporation of Delaware Application August 10, 1946, Serial No. 689,656

15 Claims. (Cl. 178—5.4)

This invention relates to television receiving systems, and more particularly to color filters for television image projection systems.

The transmission of television images is accomplished by analyzing the scene into its elemental areas, which are selected from the complete image or picture area in the orderly sequence of scanning, and transmitting one after the other. Since the scanning and image repetition processes are essentially artificial ones, it is possible to choose arbitrarily the scanning pattern, so long as the same scanning pattern is used at the receiver as that employed at the transmitter.

The reproduction of television images in their natural color can be accomplished by additive methods through transmitting sequentially signals representative of each of three selected primary or component colors. These colors are usually red, blue, and green, taken in any appropriate order. The natural color image is reproduced by a scanning operation similar to that scanning operation at the transmitting station.

As is well known in the art, this transmission of images in their natural color can be accomplished by the use of mobile color filters of the three selected primary or component colors which are used for color separation and positioned in the optical path of the transmitting camera tube and controlling a like set of filters in front of the image reproducing tube.

For the purpose of enlarging the reproduced image, it has been proposed to project a television image by means of a spherical mirror, together with a correcting plate to focus on an image plane located at a finite distance from the source. The combination of the mirror and the correcting plate has been set forth and described by Daniel A. Landis in U. S. Patent No. 2,273,801, dated February 17, 1942. By intercepting the projected image with a color filter similar to that used at the transmitting station, images in their natural color may be projected.

According to this invention, a color filter disk is placed in the optical path of the image projection and the disk is adapted to change in color in synchronism with the change in color of the filter at the transmitting station.

The primary object of this invention is to provide an improved color television system.

Another object of this invention is to provide an improved color television receiver of the projection type.

A further object of this invention is to provide an improved color filter system for the reproduction of images in their natural color.

Other and incidental objects of the invention will be apparent to those killed in the art from a reading of the following specification and an inspection of the accompanying drawing in which.

Figures 1, 4:
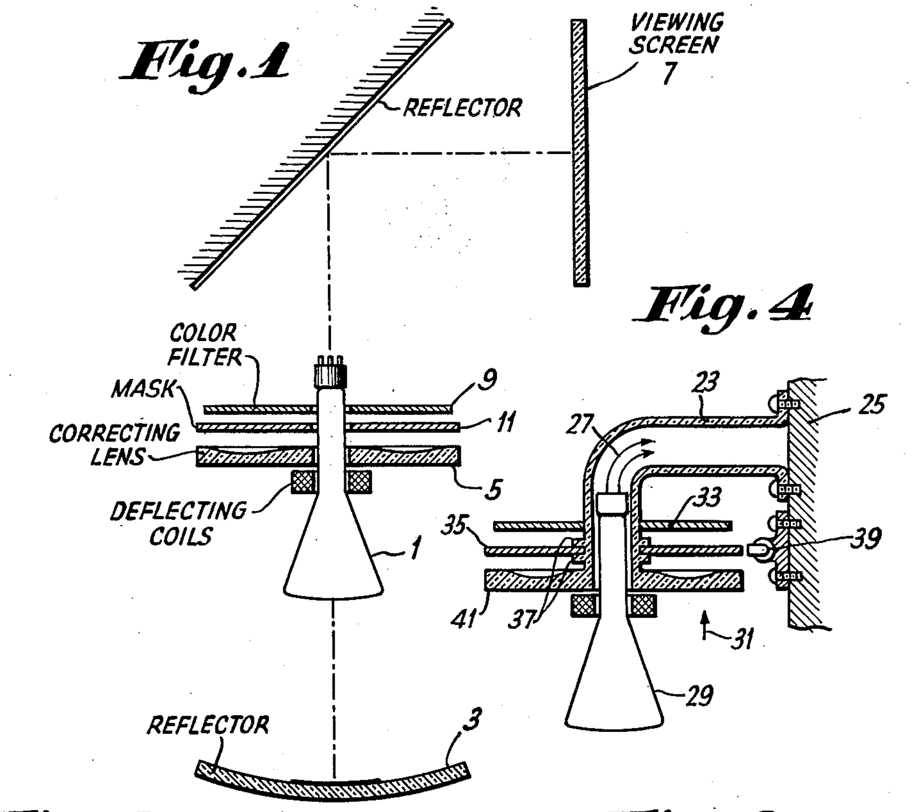
Figure 1 shows schematically a preferred form of this invention, as employed in a color television receiver of the projection type.
Figure 4 shows schematically one form of support for the filter disk, mask disk and associated projection tube.

Referring now in detail to Figure 1, there is shown a type of optical system which may be employed in a television receiver embodying this invention. Relative dimensions are given merely by way of example, and in no way are intended to limit the application of this invention.

The system comprises an image tube 1 of the projection type. A projection kinescope is shown and described by V. K. Zworykin and W. H. Painter in an article entitled "Development of the Projection Kinescope," beginning on page 937 of "Proceedings of the Institute of Radio Engineers," August 1937, vol. 25, No. 8. The image formed on the face of projection tube 1 is reflected in the spherical mirror 3 through correcting plate 5 to the viewing screen 7.

A projection system of this type is well known in the art and may, for example, take the form of that shown and described in the above mentioned U. S. Patent No. 2,273,801.

A component color separation filter element 9 and a mask element 11 are included in the optical system between the image tube 1 and the image viewing screen 7. The filter element 9 and the mask element 11 are positioned adjacent each other and, for purposes of illustration, are adjacent correcting plate 5 and on the side of the correcting plate 5 nearest the projection screen 7.

Figure 2:
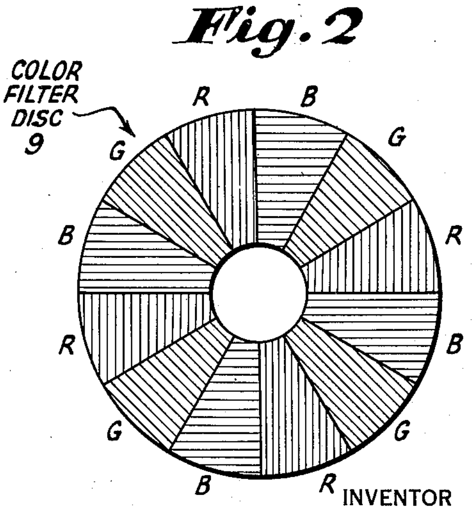
Figure 2 shows schematically a preferred form of color filter disk.

The detailed construction of the filter element 9 is shown in Figure 2. The filter element shown in Figure 2 is made up of radial sections of the three selected primary or component colors as shown by the initials "R" for red, "B" for blue, and "G" for green. A hole is made in the center of the filter element in order that the base of the image tube 1 may project therethrough. A filter element having a plurality of each of the red, blue, and green sections is shown. It is not intended, however, that the filter element should necessarily have the exact number of sections shown, but an element having four groups of primary or component color separation filters is illustrated for the purpose of explanation.

In view of the fact that the mask and the filter elements are adjacent each other, the transparent area of the mask can be of approximately the same size as any one filter area of the component color filter unit.

Figure 3:
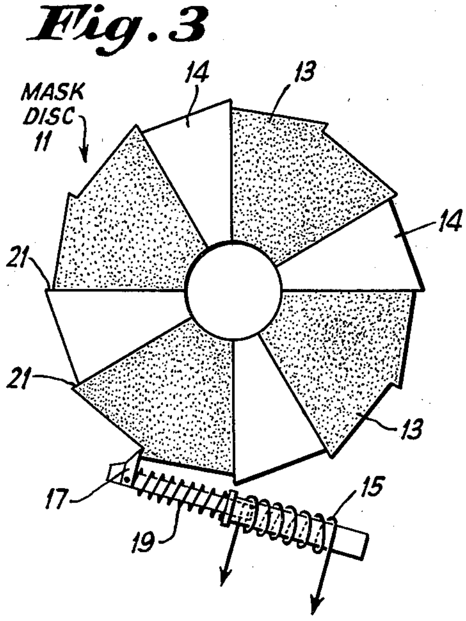
Figure 3 illustrates schematically one form of mask disk for association with the filter disk shown in Figure 2.

Turning now to Figure 3, there is shown a mask element adapted to be positioned adjacent the component color filter element shown in Figure 2. The mask element shown in Figure 3 contains opaque sections 13 which are shown cross-hatched, and open or transparent sections 14 which are shown as unsectioned. It will be seen that if the mask element shown in Figure 3 is placed over the filter element shown in Figure 2 and properly brought into line with corresponding sections, only one of the primary colors will be visible, due to the fact that the mask opaque sections are approximately twice the area of the transparent or open sections. Also, the open or transparent mask sections are each of substantially the same size as the individual component color filter elements, since both the mask and filter disks are placed very close to each other in use. It will also be seen that if the mask element shown in Figure 3 is rotated periodically through an angle equal to the angle subtended by one of the sections, there will be produced a color filter changing from red to blue to green in progressive steps periodically in accordance with a predetermined frequency. The predetermined frequency will be governed by the transmitting station and will coincide with the color field repetition rate.

The rotating of the mask element or the filter element can be accomplished, for example, by use of an electrical solenoid 15 having a ratchet or pawl 17 and a spring 19, the spring 19 being employed to return the ratchet or pawl 17 to its original position. The mask element contains notches 21 to enable pawl 17 to engage the element. The electrical solenoid 15 may receive its energy from an electrical circuit kept in synchronism with the scanning operation at the transmitting station so that for each field deflection control signal, the mask will be moved one step under the energization of the solenoid 15.

By providing the filter element shown in Figure 2 with a suitable rotating mechanism, it might be rotated in place of the mask, thus leaving the mask element in a fixed position. Alternatively, both the filter element and the mask may be driven in opposite directions by individual mechanisms, each operating at one-half the speed that would normally be required when one of the elements is held fixed.

While not shown for simplification of illustration, the received video signals are used in normal manner to control the production of the electro-optical images in the image producing tube 1. The synchronizing signal components accompanying the video signals serve not only to synthesize the image production but also, as above suggested, each field synchronizing signal causes solenoid 15 to be energized, and in step-by-step manner the different color areas of the component color separation filter element 9 are revealed before the transparent or open sections of the masking element 14.

The elements 9 and 11 may be made in any desired manner, but one suitable form comprises a pair of transparent plastic (methyl-methacrylate) plates between which the color filter elements (such as Wratten filters #25, 47 and 58) may be placed (or the opaque sections, if the element is the mask), and then the separate element areas may be fused together for operation.

If a bicolor system is used in place of a tricolor system, the two colors will appear alternately in the filter element 9, and in combination with the mask element will provide opaque and transparent sections of like size.

Likewise, in a tricolor system with a key image added, the color separation filter element 9 would be modified to include red, blue, and green areas with a completely transparent area. The masking element 11 would then contain an opaque area three times the area of its transparent area.

In Figure 4, there is shown one form of support mechanism wherein an arm 23 is fixed, for example, to the side 25 of the associated cabinet structure. Arm 23 is preferably hollow and is utilized also for supporting the electrical wires 27 of the projection tube 29. Arm 23 may also be shaped to reduce its effective area with regard to the direction of the light rays indicated by the arrow 31.

The associated filter disk 33 is mounted on the fixed position.

The mask disk 35, however, is mounted rotatably with regard to arm 23 by bearing flanges 37.

The mask disk rotating element 39 takes the form, for example, of the solenoid and ratchet device illustrated in Figure 3, and it is also fixed to the cabinet side 25 at the edge of the mask disk 35.

The correcting lens 41 may also be supported by the arm 23, as illustrated.

The correcting lens, spherical mirror and electrical connections, together with support mechanisms, may also take the form illustrated in U. S. patent application of I. G. Maloff, Serial No. 613,331, filed August 29, 1945, entitled "Television Projection System."

Another example of arrangement for support of projection tube and associated correcting lens is shown and described in the application of W. D. Epstein, Serial No. 606,215, filed July 20, 1945, Patent No. 2,455,476, issued December 7, 1948, and also entitled "Television Projection System."

Having thus described my invention, what is claimed is:

1. In a television image projector of the type employing a light source, a spherical mirror, a correcting plate, and a viewing screen, a component color separation filter system for reproducing images in their natural color comprising in combination a component color separation filter element having sections of the selected component colors and spaced intermediate said light source and said viewing screen, and a mask element adjacent said color separation filter element and having therein opaque and transparent sections, said filter element and said mask element being in different planes and positioned rotatably with respect to each other so as to permit only one of said component colors to intercept light from said light source at any one time.

2. In a television image projector of the type employing a light source, a spherical mirror, a correcting plate, and a viewing screen, a component color separation filter system for reproducing images in their natural color comprising in combination a component color separation filter element having sections of the selected three component colors and spaced adjacent said correcting plate, and a mask element adjacent said color separation filter element and having therein opaque and transparent sections, said transparent sections corresponding substantially in size and shape to one selected component color set of sections of said filter, said filter element and said mask element being positioned rotatably with respect to each other so as to permit only one of said component colors to intercept light from said light source at any one time.

3. In a television image projector of the type employing a light source, a spherical mirror, a correcting plate, and a viewing screen, a component color separation filter system for reproducing images in their natural color comprising in combination a component color separation filter element having sections of the selected three component colors and spaced adjacent said correcting plate and on the side of said correcting plate toward said viewing screen, and a mask element separated from said color separation filter element said mask element having therein opaque and transparent sections, said filter element and said mask element being positioned rotatably with respect to each other so as to permit only one of said component colors to intercept light from said light source at any one time.

4. In a television image projector of the type employing a light source, a spherical mirror, a correcting plate, and a viewing screen, a component color separation filter system for reproducing images in their natural color comprising in combination a component color separation filter element having sections of the selected three component colors and spaced adjacent said correcting plate and on the side of said correcting plate toward said spherical mirror, and a mask element parallel to said color separation filter element and having therein opaque and transparent sections, said filter element and said mask element being positioned rotatably with respect to each other so as to permit only one of said component colors to intercept light from said light source at any one time.

5. In a television image projector of the type employing a light source, a spherical mirror, a correcting plate, and a viewing screen, a component color separation filter system for reproducing images in their natural color comprising in combination a component color separation filter element having sections of the selected three component colors and spaced intermediate said light source and said viewing screen, and a mask element separated from but parallel to said color separation filter element said mask element having therein opaque and transparent sections, said filter element fixed in position and said mask element being positioned rotatably with respect to said filter element to permit only one of said component colors to intercept light from said light source at any one time.

6. In a television image projector of the type employing a light source, a spherical mirror, a correcting plate, and a viewing screen, a component color separation filter system for reproducing images in their natural color comprising in combination a component color separation filter element having sections of the selected three component colors and spaced intermediate said light source and said viewing screen, and a mask element in a different plane from said color separation filter element and having therein opaque and transparent sections, said mask element fixed in position and said filter element being positioned rotatably with respect to said mask element to permit only one of said component colors to intercept light from said light source at any one time.

7. In a television image projector of the type employing a light source, a spherical mirror, a correcting plate, and a viewing screen, a component color separation filter system for reproducing images in their natural color comprising in combination a component color separation filter element having sections of the selected three component colors, each of said component colors occurring a plurality of times in said filter element and spaced intermediate said light source and said viewing screen, and a mask element adjacent said color separation filter element and having therein opaque and transparent sections, said filter element and said mask element being positioned rotatably with respect to each other so as to permit only one of said component colors to intercept light from said light source at any one time, said opaque sections arranged to completely cover all the sections of all but one of the component colors at any one time.

8. In a television image projector of the type employing a light source, a spherical mirror, a correcting plate, and a viewing screen, a component color separation filter system for reproducing images in their natural color comprising in combination a component color separation filter element having sections of the selected three component colors and spaced intermediate said light source and said viewing screen, and a mask element adjacent said color separation filter element and having therein opaque and transparent sections, said filter element and said mask element being positioned independently with respect to each other.

9. In a television image projector of the type employing a light source, a spherical mirror, a correcting plate, and a viewing screen, a component color separation filter system for reproducing images in their natural color comprising in combination a component color separation filter element having sections of the selected three component colors and spaced intermediate said light source and said viewing screen, and a mask element adjacent said color separation filter element and having therein opaque and transparent sections, and means to periodically rotate only one of said elements through the angle subtended by each of said sections, and wherein the other of said elements is in a fixed position.

10. In a television image projector of the type employing a light source, a spherical mirror, a correcting plate, and a viewing screen, a component color separation filter system for reproducing images in their natural color comprising in combination a component color separation filter element having sections of the selected three component colors and spaced intermediate said light source and said viewing screen, and a mask element fixed in position and arranged independent of and adjacent said color separation filter element and having therein opaque and transparent sections, and means to periodically rotate said filter element through the angle subtended by each of said sections.

11. In a television image projector of the type employing a light source, a spherical mirror, a correcting plate, and a viewing screen, a component color separation filter system for reproducing images in their natural color comprising in combination a component color separation filter element fixed in position and having sections of the selected three component colors and spaced intermediate said light source and said viewing screen, and a mask element adjacent said color separation filter element and having therein opaque and transparent sections, and means to periodically rotate said mask element through the angle subtended by each of said sections.

12. In a television image projector of the type employing a light source, a spherical mirror, a correcting plate, and a viewing screen, a component color separation filter system for reproducing images in their natural color comprising in combination a component color separation filter element having sections of the selected three component colors and spaced intermediate said light source and said viewing screen, and a mask element positioned in a different plane from but adjacent said color separation filter element, said mask element having therein opaque and transparent sections, said mask elements being positioned most adjacent said correcting plate with respect to said filter element, said filter element and said mask element being positioned rotatably with respect to each other so as to permit only one of said component colors to intercept light from said light source at any one time.

13. In a television image projector of the type employing a light source, a spherical mirror, a correcting plate, and a viewing screen, a component color separation filter system for reproducing images in their natural color comprising in combination a circular component color filter disk having sectorially shaped areas divided substantially equally into three selected component colors, said filter being supported in the space intermediate said light source and said viewing screen, and a separate circular mask disk supported substantially adjacent said color filter disk and having therein opaque and transparent substantially sectorially shaped sections, the said opaque area being of the order of twice that of the transparent area, said filter disk being positioned substantially adjacent said correcting plate and said mask disk, said filter disk and said mask disk being rotatably supported with respect to each other to permit only one of said primary colors to intercept light from said light source at any one time.

14. In a television image projector of the type employing an image tube adapted to produce images by scanning operations, a spherical mirror, a correcting plate, and a viewing screen, a component color separation filter system for reproducing images in their natural color comprising in combination a component color separation filter element having sections of the selected three component colors and spaced intermediate said light source and said viewing screen, and a mask element adjacent said color separation filter element and having therein opaque and transparent sections, said filter element and said mask element being positioned separately and rotatably with respect to each other so as to permit only one of said component colors to intercept light from said light source at any one time and only during the scanning operation representative of the corresponding component color.

15. In a television image projector of the type employing an image tube adapted to produce images by scanning operations, a spherical mirror, a correcting plate, and a viewing screen, a component color separation filter system for reproducing images in their natural color comprising in combination a component color separation filter element having sections of the selected three component colors and spaced intermediate said light source and said viewing screen, and a mask element adjacent said color separation filter element and having therein opaque and transparent sections, said filter element and said mask element each being positioned rotatably in opposite directions with respect to each other so as to permit only one of said component colors to intercept light from said light source at any one time.

RICHARD C. WEBB.

REFERENCES CITED

The following references are of record in the file of this patent:

UNITED STATES PATENTS

| Number | Name | Date |
|---|---|---|
| 2,295,443 | Wilson | Sept. 8, 1942 |
| 2,310,337 | Anderson | Feb. 9, 1943 |
| 2,313,062 | Goldmark | Mar. 9, 1943 |
| 2,319,804 | Dyer | May 25, 1943 |
| 2,417,621 | Traub | Mar. 18, 1947 |